United States Patent [19]
Constantijn et al.

[11] Patent Number: 5,984,333
[45] Date of Patent: Nov. 16, 1999

[54] WHEELCHAIR WHICH IS PROVIDED WITH A SWIVEL CASTOR

[75] Inventors: Marius Constantijn, Veldhoven; Arnoldus V. Vorst, Heeze, both of Netherlands

[73] Assignee: Ligtvoet Products B.V., Netherlands

[21] Appl. No.: 08/878,727

[22] Filed: Jun. 19, 1997

[30] Foreign Application Priority Data

Jun. 21, 1996 [NL] Netherlands ............................ 1003396

[51] Int. Cl.⁶ .................................................. B60K 1/02
[52] U.S. Cl. ...................... 280/250.1; 16/35 D; 16/18 A; 280/304.1
[58] Field of Search .................................. 280/250.1, 89, 280/304.1; 16/18 A, 35 D

[56] References Cited

U.S. PATENT DOCUMENTS

| | | | |
|---|---|---|---|
| 3,802,524 | 4/1974 | Seidel | 180/6.5 |
| 4,241,932 | 12/1980 | Hartmann | 280/265 |
| 4,953,645 | 9/1990 | Korber et al. | 180/6.5 |
| 5,022,476 | 6/1991 | Weege | 180/6.5 |
| 5,762,155 | 6/1998 | Scheulderman | 280/268 |
| 5,899,469 | 5/1999 | Pinto et al. | 280/79.11 |

FOREIGN PATENT DOCUMENTS

PCT/GB95/02680 11/1995 WIPO.

Primary Examiner—Lanna Mai
Assistant Examiner—Avraham H. Lerner
Attorney, Agent, or Firm—McCutchen, Doyle, Brown & Enersen

[57] ABSTRACT

A wheelchair with adjustable swivel castors is described. The wheelchair includes a mechanism to limit the swivel range of the castors. The swivel range may be limited manually or automatically as a function of the terrain or the speed of the chair.

7 Claims, 3 Drawing Sheets

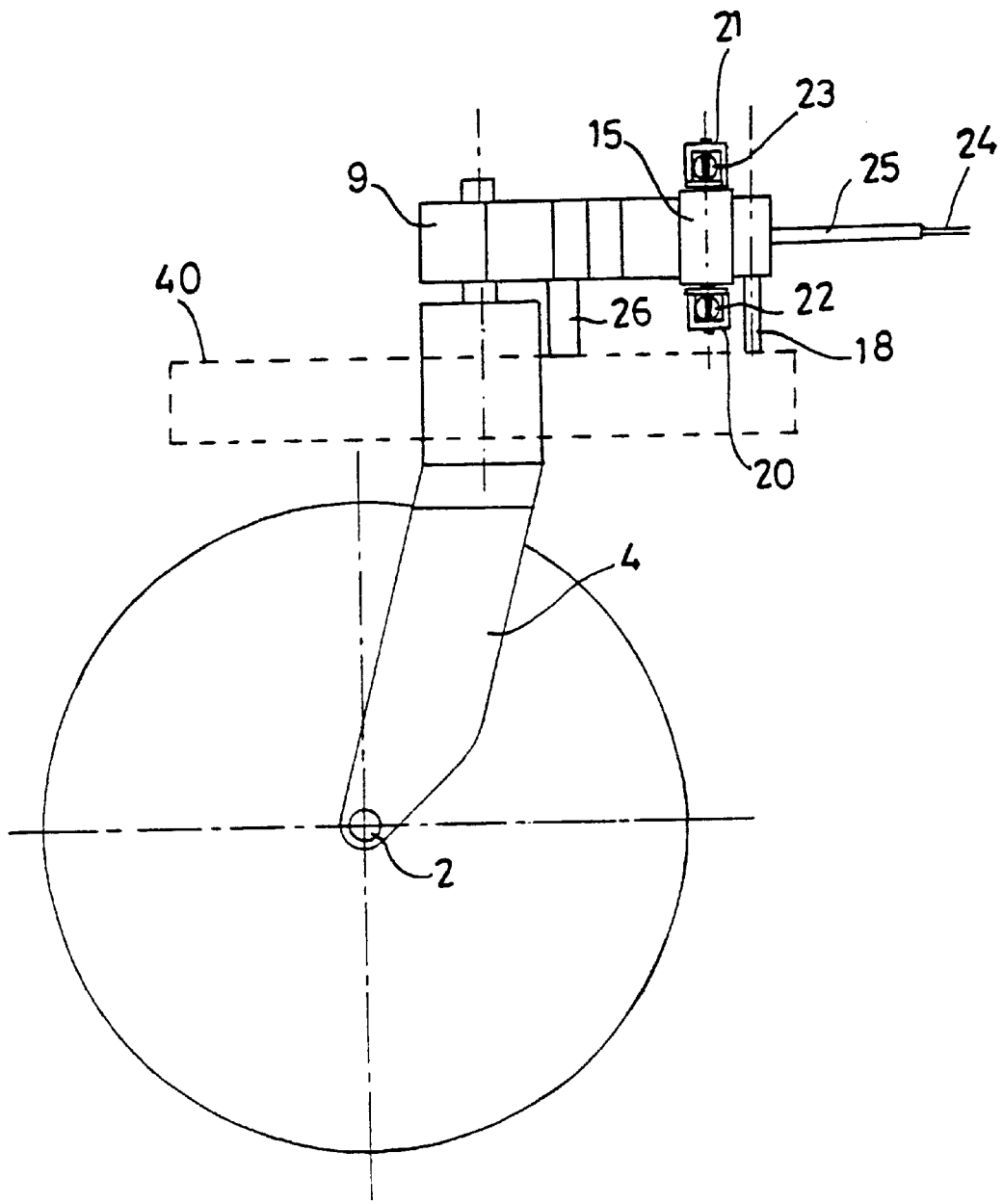

1

WHEELCHAIR WHICH IS PROVIDED WITH A SWIVEL CASTOR

BACKGROUND OF THE INVENTION

The present invention relates to a wheelchair, which is provided with wheels for driving and steering the wheelchair and with at least one swivel castor, which bears part of the weight of the wheelchair and has a swivel axle, the swivel castor having a swivel range which lies in a first swivel area which includes the straight-on direction of travel of the wheelchair, and the swivel castor being freely pivotable about the swivel axle in the first swivel area.

A wheelchair of this kind is generally known. The front wheels for driving and steering can be driven by means of manual force or by means of, for example, one or more electric motors. The axes of the axles of the wheels for driving and steering generally coincide. In order to prevent the wheelchair from tipping backwards about the common axis of the front wheels, the wheelchair at the rear side has substantially freely pivotable swivel castors. The wheels for driving and steering and the swivel castors are positioned such that the mass centre comes to lie between the common axis of the wheels for driving and steering and the swivel castors. The swivel castors have the ability to pivot about the swivel axle such that they are in a position which corresponds to the direction of travel, which is determined by the front wheels, of the wheelchair.

The drawback of a wheelchair of this kind is that when taking bends the wheelchair tends to break out of the bend. This oversteer effect is caused by the centripetal force acting on the mass centre of the wheelchair. The oversteer effect occurs in particular when taking a bend at high speed.

SUMMARY OF THE INVENTION

The object of the invention is to provide a wheelchair which does not have this drawback.

To this end, the wheelchair according to the invention is characterized in that the wheelchair comprises means which can be switched on and off and which limit the swivel range of the swivel castor to a second swivel area which is smaller than the first swivel area, with the straight-on direction of travel of the wheelchair being included within the second swivel range.

The possibility of the wheelchair breaking out of the bend is counteracted by the frictional forces exerted by the ground on the swivel castors which are in the limited swivel position.

Further preferred embodiments of a wheelchair according to the invention are described in the claims.

In order to counteract the problem of oversteer of the wheelchair mentioned in the introduction to the description, a wheelchair which is described below is provided.

BRIEF DESCRIPTION OF THE DRAWINGS

The wheelchair according to the invention will be explained in more detail below with reference to the enclosed drawings, in which.

DETAILED DESCRIPTION OF PREFERRED EMBODIMENT OF THE INVENTION

Figure 4:
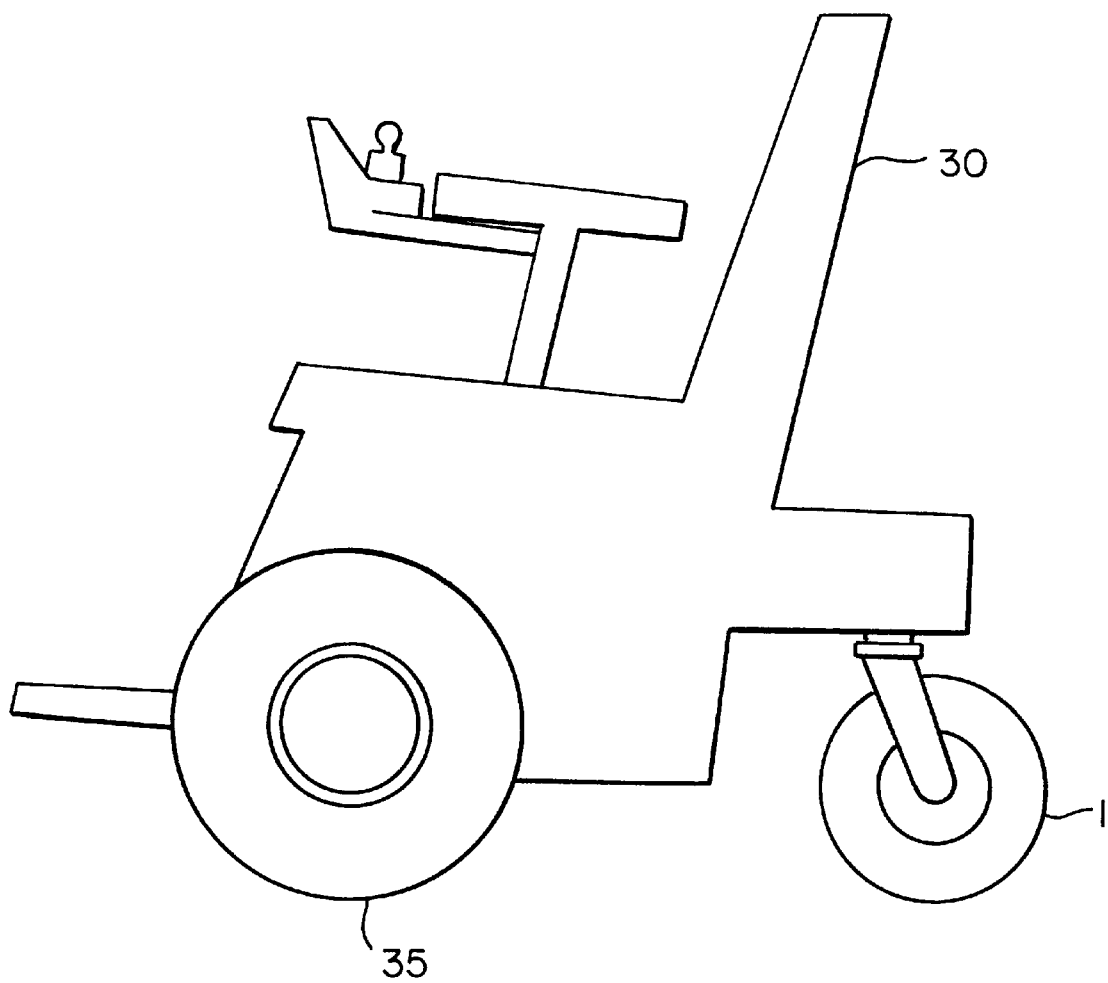
FIG. 4 is a side view of a wheelchair.

FIG. 4 depicts a wheelchair 30 with a wheel 35 and castor 1.

Figure 1:
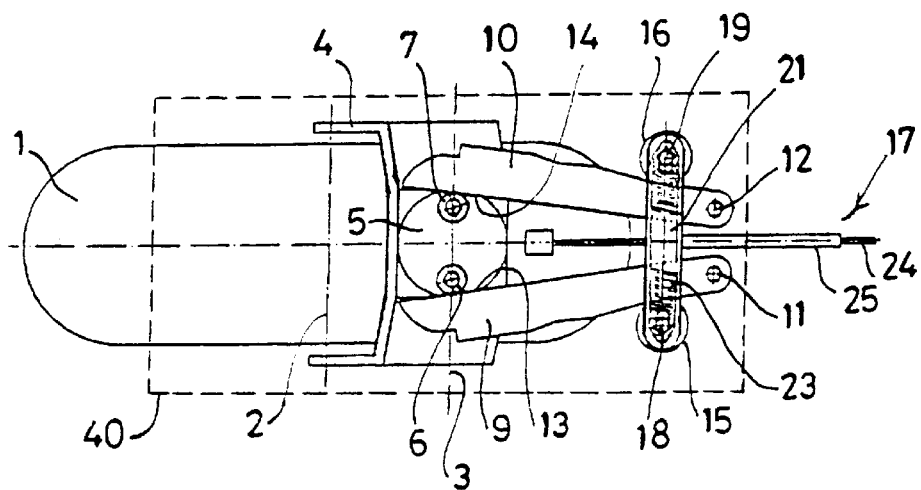
FIG. 1 is a top view of a diagrammatic depiction of a swivel castor of a wheelchair according to the invention, with the means which limit the swivel range switched off.

FIG. 1 depicts a swivel castor of a wheelchair according to the invention. The swivel castor substantially comprises a castor 1 which by means of a horizontal castor axle 2 is fastened in a substantially U-shaped frame 4. A vertical swivel axle 5 is arranged on top of the frame 4. The straight-on direction of travel of the wheelchair, both forwards and in reverse, is indicated by line 3.

The swivel axle 5 is fastened in the chassis 40, which is indicated diagrammatically by the dashed line, of the wheelchair according to the invention such that the frame 4 with the castor 1 fastened therein can pivot freely about the vertical swivel axle 5 over a swivel range which lies in a first swivel area.

Furthermore, FIG. 1 shows means for limiting the swivel range of the swivel castor to a second swivel area which is smaller than the first swivel area. In the depicted preferred embodiment of the wheelchair according to the invention, the means which limit the swivel range comprise two projections 6, 7, which are arranged at the upper free end of the swivel axle 5. The two projections 6, 7 are located diametrically opposite one another on the upper free end of the swivel axle 5 and are thus eccentric with respect to the axis of the swivel axle 5.

The means which are depicted in FIG. 1 and which limit the swivel range furthermore comprise two arms 9, 10, two pressure-exerting rollers 15, 16 and a Bowden cable 17.

The arms 9, 10 are fastened pivotably to the chassis 40 of the wheelchair by means of vertical pins 11, 12 and are located symmetrically with respect to a plane through the axis of the swivel axle 5, the arms 9, 10 extending from the pins 11, 12 at least as far as past the swivel axle 5.

The projections 6, 7 on the upper free end of the swivel axle 5 are situated between the arms 9, 10.

The arms 9, 10 each have a stop surface 13, 14 against which the projections 6, 7 come to bear. The shape of the arms 9, 10 is such that they become wider, in a direction perpendicular to the swivel axle 5, from the pins 11, 12 towards the swivel axle.

The pressure-exerting rollers 15, 16 have pivot pins 18, 19. Both ends of the pivot pins 18, 19 project into slot-shaped openings in roller holders 20, 21. The pivot pins 18, 19 of the pressure-exerting rollers 15, 16 are connected to one another by means of tension springs 22, 23, which are situated in the roller holders 20, 21. The tension springs 22, 23 exert forces directed towards one another on the pressure-exerting rollers 15, 16. The roller holders 20, 21 are fixedly connected to one another.

The assembly comprising pressure-exerting rollers 15, 16, roller holders 20, 21 and tension springs 22, 23 can be placed over the arms 9, 10 such that the pressure-exerting rollers 15, 16 act on the outer surfaces of the arms 9, 10. With the aid of the Bowden cable 17 and an actuating member (not shown), the pressure-exerting rollers 15, 16 are displaced over the outer surfaces of the arms 9, 10. The inner cable 24 of the Bowden cable 17 is in this case fixedly connected to the chassis 40. With the aid of the actuating member (not shown), the outer cable 25 slides over the inner cable 24 and in the process displaces the pressure-exerting rollers 15, 16.

In the position of the pressure-exerting rollers 15, 16 with respect to the arms 9, 10 which is depicted in FIG. 1, the pressure-exerting rollers 15, 16 exert scarcely any force on the arms 9, 10. Consequently, no force is transmitted by the arms 9, 10 onto the projections 6, 7. In this position, the swivel castor can pivot freely about its vertical swivel axle 5 over a swivel range, preferably 360°, which lies in a first swivel area.

Figure 2:
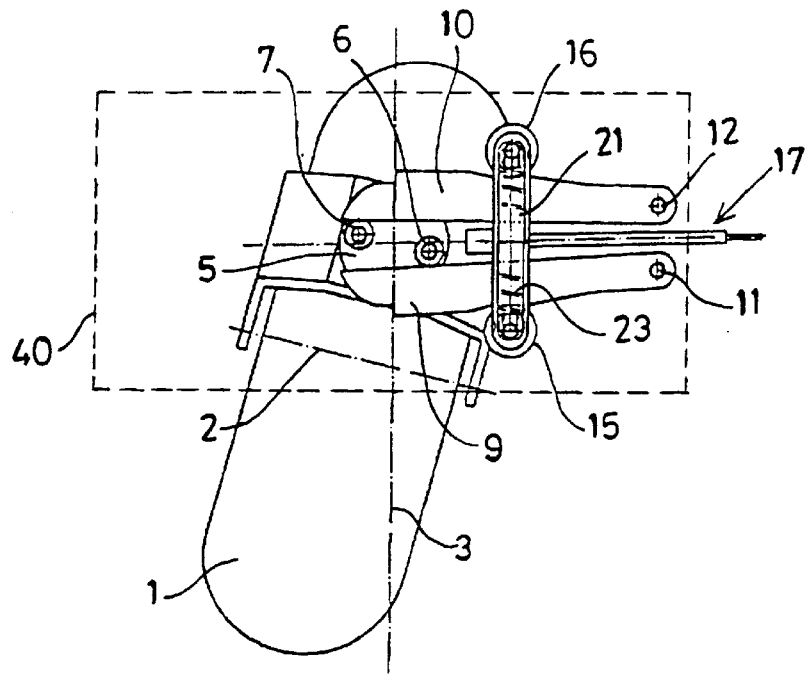
FIG. 2 is a diagrammatic depiction of a swivel castor of a wheelchair according to the invention with the means which limit the swivel range switched on, FIG. 3 is a side view of the swivel castor of FIG. 1.

FIG. 2 depicts the situation in which the pressure-exerting rollers 15, 16 have been displaced by the Bowden cable 17 over the arms 9, 10, from the pivot pins 11, 12 in the direction of the swivel axle 5. Since the arms 9, 10 become wider towards the swivel axle 5, the arms 9, 10 are moved towards one another by the pressure-exerting rollers 15, 16. If the swivel castor seeks to pivot out of the straight-on position of travel, the projections 6, 7 are detained by the arms 9, 10. The restoring forces of the tension springs 22, 23 move the swivel castor into a position which corresponds to the straight-on direction of travel. However, these forces are not so great that the swivel castor can no longer pivot at all. The swivel range of the swivel castor is now limited to a second swivel area, and is preferably 15° on either side of the straight-on direction of travel of the swivel castor. Due to the swivelling of the swivel castor, the projections 6, 7 exert a force on the arms 9, 10, as a result of which the latter move apart. The arms 9, 10 in turn exert a force on the pressure-exerting rollers 15, 16 counter to the restoring force of the tension springs 22, 23. As a consequence of this force, the pressure-exerting rollers move apart. The maximum distance between the pressure-exerting rollers 15, 16 is determined by the slot openings in the roller holders 20, 21.

In the position of the pressure-exerting rollers 15, 16 which is depicted in FIG. 2, the second swivel area is thus determined by the slot openings in the roller holders 20, 21.

In a preferred embodiment of the wheelchair according to the invention, in both the switched-on and switched-off state of the means which limit the swivel range, a force is exerted on the swivel castor, which force moves the swivel castor into a position which corresponds to the straight-on direction of travel of the wheelchair. This prevents the swivel castor from starting to swing about when the swivel castor comes off the ground as a result of unevenness of the ground. This swinging about of the swivel castor leads to jolting and an undesirable swinging behaviour of the wheelchair.

If the means which limit the swivel range are switched on, the force which is exerted on the swivel castor in order to move the swivel castor into the position which corresponds to the straight-on direction of travel of the wheelchair is greater than if the means which limit the swivel range are switched off.

FIG. 3 illustrates the assembly comprising arms 9, 10, pressure-exerting rollers 15, 16, roller holders 20, 21 and tension springs 22, 23.

The inner cable 24 of the Bowden cable 17 is fixedly connected to the chassis 40 via support 26. The pivot pins 18, 19 are also fixedly connected to the chassis 40.

In a preferred embodiment of the wheelchair according to the invention, the means which limit the swivel range are automatically switched on. A control unit, in which a number of predetermined speeds can be stored, is provided for this purpose.

It is also possible to use sensors to measure the vertical acceleration of the wheelchair and to process this data, by means of the control unit, to give a recommended speed at which the means which limit the swivel range should be switched on.

In another preferred embodiment of the wheelchair according to the invention, the means which limit the swivel range can be switched on manually.

The wheelchair according to the invention is preferably a front-wheel drive wheelchair.

In a preferred embodiment of a wheelchair according to the invention, the wheelchair is provided with means for travelling straight on, which means exert on the swivel castor a force which moves the swivel castor into the position which corresponds to the straight-on direction of travel of the wheelchair. The means for traveling straight on can be controlled automatically or manually, possible parameters which can be used for the continuous adjustment of the force being the speed of the wheelchair and/or the condition of the ground.

What is claimed is:

1. A wheelchair which is provided with wheels for driving and steering the wheelchair and with at least one swivel castor, the swivel castor bearing part of the weight of the wheelchair, the swivel castor having a swivel axle and a swivel range which lies in a first swivel area which includes a straight-on direction of travel of the wheelchair, and the swivel castor being freely pivotable about the swivel axle in the first swivel area; the wheelchair further being provided with swivel range limiting means which are adapted to be switched on and off and which, when switched on, limit the swivel range of said swivel castor to a second swivel area which is smaller than said first swivel area, with said straight-on direction of travel of the wheelchair being included within the second swivel range;

wherein said swivel range limiting means comprise at least one projection arranged eccentrically on the swivel axle, and at least one movable element which is provided with stop surfaces, said movable element being movable between a first position in which the swivel range of the swivel castor lies in said first swivel area, and a second position in which said element interacts with said projection to limit the swivel range of the swivel castor to said second swivel area.

2. A wheelchair according to claim 1, wherein said swivel range limiting means are automatically switched on when a wheelchair speed exceeds a predetermined speed.

3. A wheelchair according to claim 1, wherein said swivel range limiting means switch on as a function of the condition of the ground over which the wheelchair is traveling.

4. A wheelchair according to claim 1, further provided with force exerting means which are adapted to exert on said swivel castor a force which moves said swivel castor towards a position which corresponds to said straight-on direction travel of the wheelchair.

5. A wheelchair according to claim 1, wherein said swivel range limiting means comprise two arms which are pivotably connected to a chassis part of the wheelchair and which each define a stop surface.

6. A wheelchair according to claim 5, further comprising pressure-exerting elements which are movable to and fro over outer surfaces of said arms, said pressure-exerting elements being connected to one another by means of pressure-exerting element holders and being connected to an actuating member by means of a Bowden cable;

wherein said eccentrically arranged production is situated between said stop surfaces of said arms; and wherein said pressure-exerting elements are capable of placing said arms in a position which limits the swivel area.

7. A wheelchair which is provided with wheels for driving and steering the wheelchair and with at least one swivel castor, the swivel castor bearing part of the weight of the wheelchair, the swivel castor having a swivel axle and a swivel range which lies in a first swivel area which includes a straight-on direction of travel of the wheelchair, and the swivel castor being freely pivotable about the swivel axle in the first swivel area; the wheelchair further being provided with swivel range limiting means which are adapted to be switched on and off and which, when switched on, limit the swivel range of said swivel castor to a second swivel area which is smaller than said first swivel area, with said straight-on direction of travel of the wheelchair being included within the second swivel range;

wherein said swivel range limiting means comprise at least one projection arranged eccentrically on the swivel axle, two arms which are pivotably connected to a chassis part of the wheelchair and which each define a stop surface which interacts which said projection to limit the swivel range of the swivel castor to said second swivel area;

wherein said arms are capable of being placed by means of pressure-exerting elements, which are movable to and fro over outer surfaces of said arms in a position which limits the swivel area, said pressure-exerting elements being connected to one another by means of a pressure-exerting element holders and being connected to an actuating member by means of a Bowden cable;

wherein said eccentrically positioned projection is situated between said stop surfaces of said arms.

\* \* \* \* \*